(12) United States Patent
Peterson et al.

(10) Patent No.: US 6,272,756 B1
(45) Date of Patent: Aug. 14, 2001

(54) DEVICE FOR FLEXIBLE LINE VEGETATION TRIMMERS AND OTHER APPLICATIONS

(76) Inventors: Dennis R. Peterson; Joseph A. Peterson; Mary L. Peterson, all of 12313 Scribe, Austin, TX (US) 78758

( * ) Notice: Subject to any disclaimer, the term of this patent is extended or adjusted under 35 U.S.C. 154(b) by 0 days.

(21) Appl. No.: 09/460,620

(22) Filed: Dec. 14, 1999

Related U.S. Application Data (63) Continuation of application No. 09/120,811, filed on Jul. 22, 1998
(60) Provisional application No. 60/112,216, filed on Dec. 14, 1998, and provisional application No. 60/133,090, filed on May 7, 1999.

(51) Int. Cl.[7] ..................................................... A01D 34/90
(52) U.S. Cl. ................................................. 30/347; 30/276
(58) Field of Search ......................... 30/276, 347; 56/12.7

(56) References Cited

U.S. PATENT DOCUMENTS

| | | | |
|---|---|---|---|
| 5,675,897 | * | 10/1997 | Berfield .................................. 30/276 |
| 5,743,019 | * | 4/1998 | Berfield .................................. 30/276 |

* cited by examiner

*Primary Examiner*—Douglas D. Watts
(74) *Attorney, Agent, or Firm*—Skjerven Morrill MacPherson LLP; Jack V. Musgrove (57) ABSTRACT

A cutting head for a rotary flail retains a coil portion of a cutting line on a spool, and feeds a portion of an excess of the cutting line to the spool to adjust the coil portion and thereby restore a length of the distal portion of the cutting line to maintain a cutting circle of desired size. The distal portion of the cutting line is extended by locating the coil portion such that a centrifugal force arising from rotation of the distal portion overcomes a drag force on the coil portion to unwind a precise amount of the coil portion from the spool. A magazine stores the excess of the cutting line, disposed in a helical path defining a helix having an axis which generally coincides with the axis of the spool. The cutting head has no moving parts, high storage capacity and multiple independent automatic line capability.

9 Claims, 10 Drawing Sheets

DEVICE FOR FLEXIBLE LINE VEGETATION TRIMMERS AND OTHER APPLICATIONS

CROSS-REFERENCE TO RELATED APPLICATIONS

The present application claims priority from U.S. Provisional Applications Nos. 60/112,216 (filed on Dec. 14, 1998) and 60/133,090 (filed on May 7, 1999), which is a con't of U.S. patent application Ser. No. 09/120,811 (filed on Jul. 22, 1998). All of the above applications are hereby incorporated.

BACKGROUND OF THE INVENTION

1. Field of the Invention

The present invention relates to garden tools, and more particularly to an apparatus for trimming vegetation, specifically one using a flexible line attached to a rotary device, generally similar to the tool popularly referred to as a "Weed-Eater." More generally, the invention pertains to a cutting head adapted for use with such a vegetation trimmer, wherein the cutting head feeds or dispenses the flexible line used to trim the vegetation.

2. Description of Related Art

Flexible line vegetation trimmers are known in the art, and are generally comprised of a long handle or rod having a cutting head at one end. The cutting head contains a spool of cutting line, similar to fishing line (polymeric monofilament), and a rotary device which causes the free end of the line to move in a circular fashion at high speed. When the cutting head is placed near overgrown vegetation, the spinning line hits the stalks or leaves and effectively cuts them away from the remainder of the plant. Flexible line vegetation trimmers have grown into a world-wide industry with annual sales exceeding a billion dollars.

One problem that has persisted with the use of flexible line trimmers (also referred to as rotary flails), is the dispensing of the cutting line from the spool. This line is typically constructed of a polymeric material that is relatively tough and durable but, after repeated use as a vegetation trimmer (or misuse on inappropriate surfaces), the line will break near the distal end, i.e., shortening the effective length of the line, and thus requiring replacement of the line, or extension of further line material from the spool.

In the prior art, there are four basic kinds of cutting heads: manual exchange; manual reel; semi-manual reel; and automatic reel. A manual exchange cutting head holds multiple lines which are not adjustable, but are instead completely removed and replaced when they get too short. The trimmer (rotary motor) must be stopped for replacement, and the stub ends are wasted. Additional material forming the mounting bracket for the lines is also discarded.

The reel types, whether manual, semi-automatic, or automatic, have a reel within a housing, and new line is delivered by releasing (rotating) this reel. With the manual reel type, the rotary motor must be stopped so the reel can be manually unlocked to extend new line. With the semi-automatic, feeding of new line is triggered by a hand lever or by bumping the cutting head on the ground. Manual and semi-automatic require the operator to monitor the line and decide when to take action. Another type of feeding device uses a mechanism which extends a length of line every time the rotary motor is slowed from a high operating speed.

The automatic reel types are equipped with a sensing device to monitor the line and activate a reel release or indexing mechanism to feed more line. A cycle of gradual decreases and sudden jumps in line length are an inherent feature because of the threshold for triggering the reel mechanism. Sudden jumps in line length cause wasted line, explaining the lack of commercial success of these types of cutting heads. Multiple independent automatic lines have been very impractical because of the complicated mechanisms involved. Today, almost all trimmers sold are equipped with bump feeds.

Reloading bump feeds is complicated and time-consuming. Casual users especially dislike the details of loading the line spool onto the cutting head. Even for those devices in which no disassembly or tools are required, it is still necessary to (i) bring the spool into loading alignment, (ii) insert the first cutting line into a loading hole, (iii) anchor the cutting line to the spool, (iv) repeat steps two and three for a second line, then (v) rotate the spool to draw the lines into the housing and wind them onto the spool. Bump feeds also have a tendency to jam. The bump button can get surrounded with mud, wet grass, or other bits of debris, and prevent proper dispensing of the line. Moreover, during feeding of a bump-type device, the head is subjected to sharp shocks which tend to jam the line in the coil and prevent smooth feeding of line. Clearing a jammed coil or bump button is time-consuming and can be further frustrating.

In light of the foregoing, it would be desirable to devise an improved method of dispensing cutting line from a vegetation trimmer. It would be particularly advantageous if the method utilized a cutting head that would rarely, if ever, jam nor need maintenance or adjustment, and was easily reloaded without tools or requiring disassembly.

SUMMARY OF THE INVENTION

It is therefore one object of the present invention to provide an improved cutting head that uses a flexible cutting line whose distal portion is repeatedly shortened by use.

It is another object of the present invention to provide such an improved cutting head usable in a vegetation trimmer, which further maintains a precise cutting circle defined by the cutting line.

It is yet another object of the present invention to provide an improved rotary flail which automatically dispenses cutting line and allows for the easy reloading of cutting line.

The foregoing objects are achieved in a cutting head for a rotary flail device, generally comprising means for retaining a coil portion of a cutting line, and means for feeding a portion of an excess of the cutting line to the retaining means to adjust the coil portion of the cutting line, and to thereby restore a length of the distal portion of the cutting line to maintain a tip circle with a desired size. The distal portion of the cutting line is extended by locating the coil portion relative to the excess of the cutting line such that a centrifugal force arising from rotation of the distal portion overcomes a drag force on the distal portion to unwind a precise amount of the coil portion from the retaining means. The retaining means may include a spool having an outer cylindrical surface upon which is wound the coil portion of the cutting line, the spool being rotatable about an axis, and means may further be provided to store the excess of the cutting line, disposed in a helical path, wherein the helical path defines a helix having an axis which generally coincides with the axis of the spool. A rotary flail may be constructed by mounting the cutting head onto a rotary motor. Multiple cutting lines may be provided. The invention affords an effective technique for maintaining cutting line length which does not require moving part, or the use of special tools or disassembly to reload.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figures 1, 2:
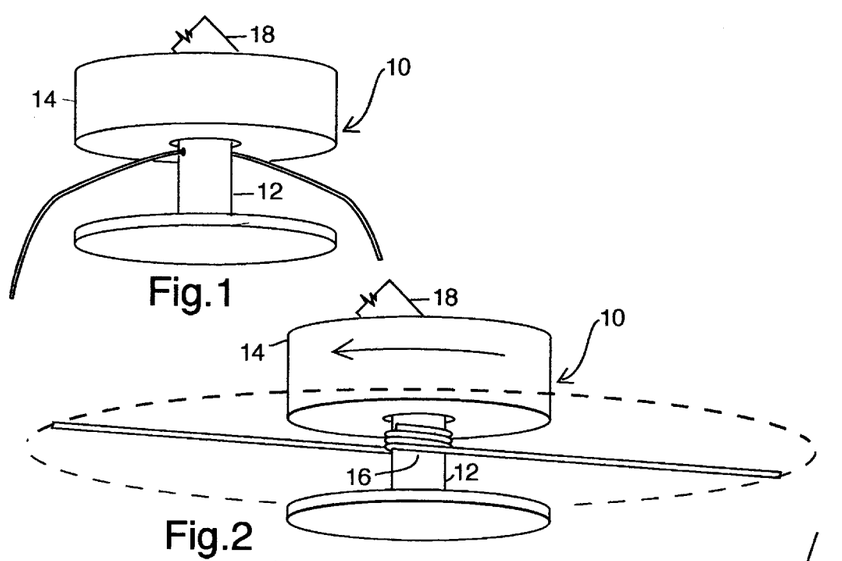
FIG. 1 is a perspective view of a dual-line push load cutting head mounted on a lawn trimmer in accordance with one embodiment of the present invention, with two dangling cutting lines extending from the first stage.
FIG. 2 is a perspective view of a spinning dual-line cutting head in accordance with one embodiment of the present invention, with the cutting lines neatly coiled around an autospool and extending tangentially.

With reference now to the figures, and in particular with reference to FIG. 1, there is depicted one embodiment 10 of a cutting head for a vegetation trimmer, constructed in accordance with the present invention. Cutting head 10 is generally comprised of an autospool 12, a storage magazine 14, and a cutting line or autocoil 16.

Autospool 12 is a spool of appropriate size to whirl (rotate or spin) a line so that the distal end of the extended cutting line follows a circle of specified diameter if the line extends tangentially (the tip circle). Autocoil 14 is the coil of cutting line wound on autospool 12. Autospool 12 provides continuous, precise, automatic control of the extended cutting line. Cutting head 10, in this embodiment, uses a two-stage autospool, equipped with a high-capacity storage magazine 14. Cutting head 10 is configured so that autospool 12 automatically reloads itself when required by extracting cutting line from storage magazine 14. As explained further below, both wear compensation and reloading of the autocoil are accomplished without any moving parts. Two types of reloading are discussed herein, manual reloading of the magazine and automatic reloading of the autospool.

Wear compensation by the autospool is described in more detail in the applications whose priorities are claimed above, and is discussed only briefly here. Feeding new line is controlled by drag and centrifugal force acting directly on the extended line. If the tip circle is correct, i.e., the length of extended line is that desired, then drag and centrifugal force balance (cancel each other out), and no unwinding or rewinding occurs. If the tip circle is too big, drag dominates over centrifugal force, and the net drag rewinds just enough of the extended line back onto the autospool. If the extended line is shortened by wear or breakage, centrifugal force dominates over drag, and the net centrifugal force unwinds the precisely correct amount of line. Because the autospool cannot, even inadvertently, extend too much line, the familiar cutoff blade to trim excess line is not required.

Reloading of the autocoil is controlled by friction between the autocoil and the autospool. When the autocoil has a full length of line, friction is high. As the line is consumed and the length of line in the autocoil declines, friction is reduced. Finally, the autocoil loses its grip on the autospool. The autocoil slips on the autospool and extracts a quantity of cutting line from the magazine, restoring the autocoil to full length. The specific dimensions of the autospool depend upon the particular application and the nature of the cutting line. In an exemplary embodiment, the cutting line used is nylon, the autospool has a diameter of 20 mm, and the tip circle is 40 cm.

Figure 3A:
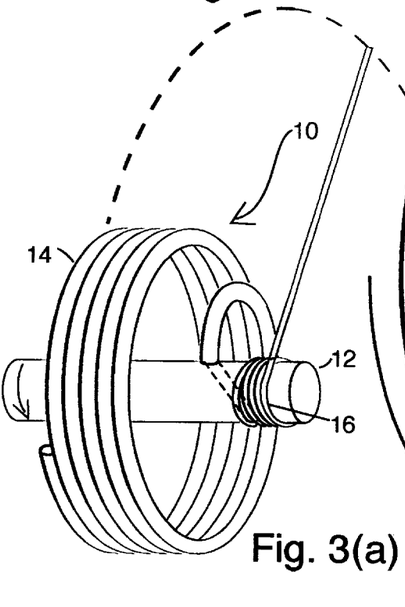
FIG. 3(a) is an isometric view of a single-line push-load cutting head composed of an autospool and a coiled tube magazine constructed in accordance with one embodiment of the present invention.
Figure 4:
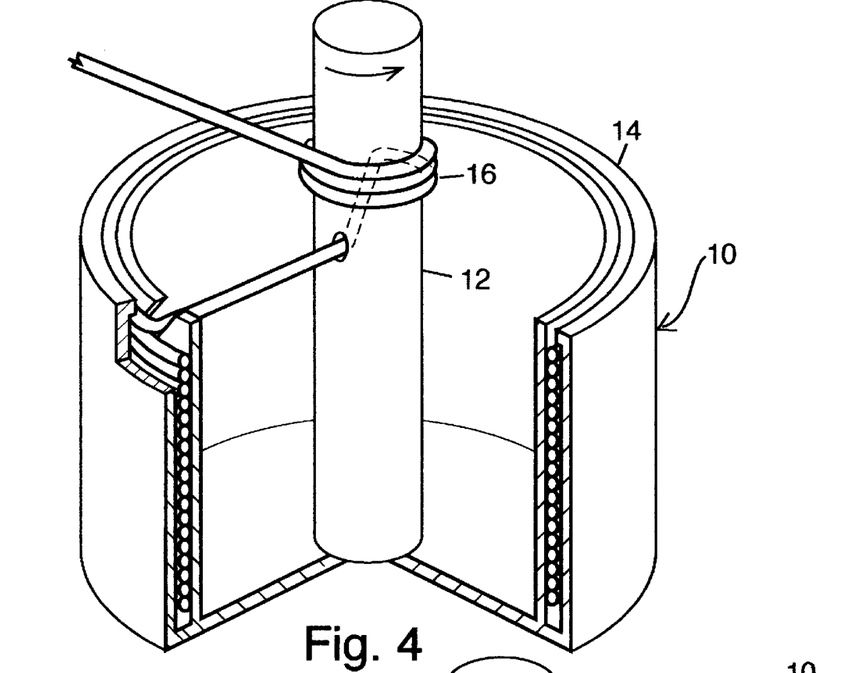
FIG. 4 is an isometric view with a cutaway of a side load cutting head constructed in accordance with another embodiment of the present invention.
Figure 5:
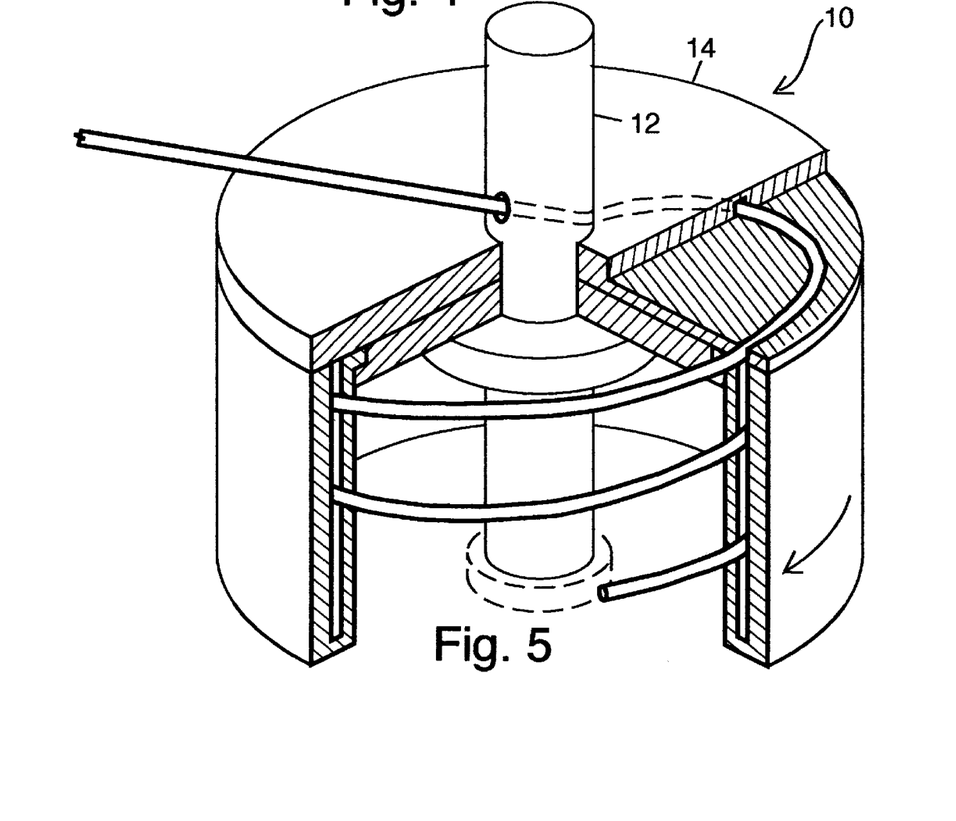
FIG. 5 is an isometric view with a cutaway of a twist load cutting head constructed in accordance with another embodiment of the present invention.

FIG. 1 is a perspective view of a twist-load model cutting head 10 mounted on a lawn trimmer 18 with the rotary motor turned off. Two cutting lines at rest hang down from autospool 12. In FIG. 2, the lawn trimmer motor is turned on, and the two whirling cutting lines are coiled neatly on the autospool and extend tangentially outward, ready to trim grass. FIGS. 3(a) through 5 illustrate three design variations well-suited for trimming lawns, which are discussed further below. All three are quick and easy to load. Each of the three has a special characteristic. FIG. 3(a) depicts a push-load model, especially easy to load. FIG. 4 depicts a side-load model. FIG. 5 depicts a twist load model having an extra large magazine, and utilizing a special loading technique for long lines.

Figure 3B:
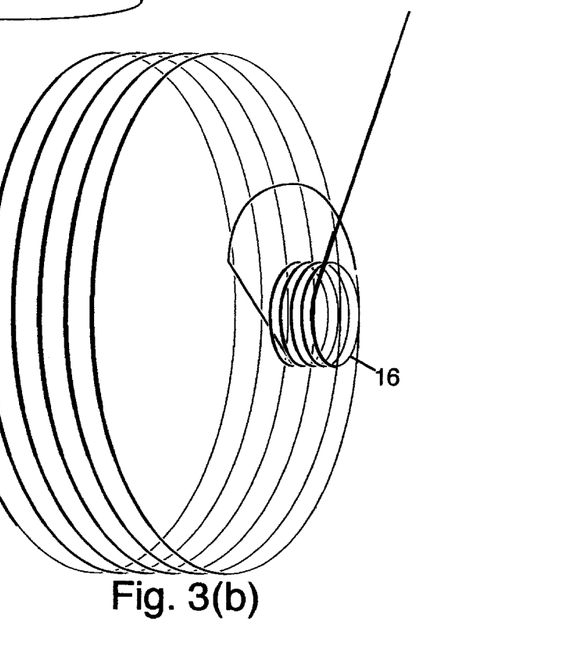
FIG. 3(b) is an isometric view of the cutting line as installed in the push load cutting head shown in FIG. 3(b)

Cutting head components are illustrated in FIGS. 3(a) and 3(b). Magazine 14, essentially a tube or conduit formed into a helix, is loaded with a helical coil of cutting line which extends through the conduit. After exiting the magazine, the cutting line forms autocoil 14 on the cylindrical surface of the autospool 12, and extends tangentially outward from the cylindrical surface of the autospool so that the distal end of the extended line traces a circle about the axis of rotation. In FIG. 3(b), the mechanical components are omitted to better illustrate the cutting line. The axis of the helix is preferably the same as the axis of the autospool, or at least generally coincides with the axis of the autospool, i.e., the axis of the helix is within the confines of the cylinder formed by the autospool.

Figure 6A:
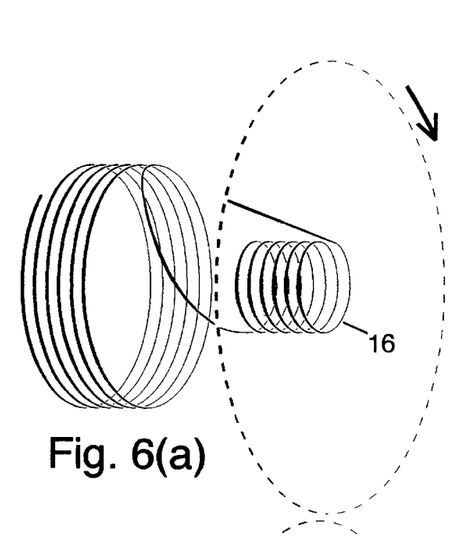
FIG. 6(a) is a schematic diagram illustrating an exemplary cutting head operating cycle for the present invention, showing the autocoil fully loaded.
Figure 6B:
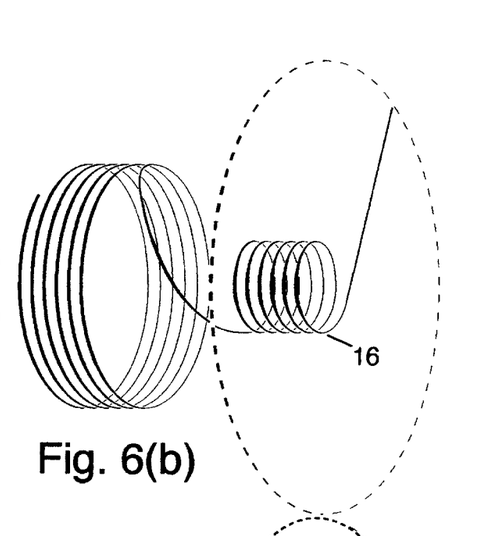
FIG. 6(b) is a schematic diagram illustrating the cutting head operating cycle showing the autocoil partially loaded.
Figure 6C:
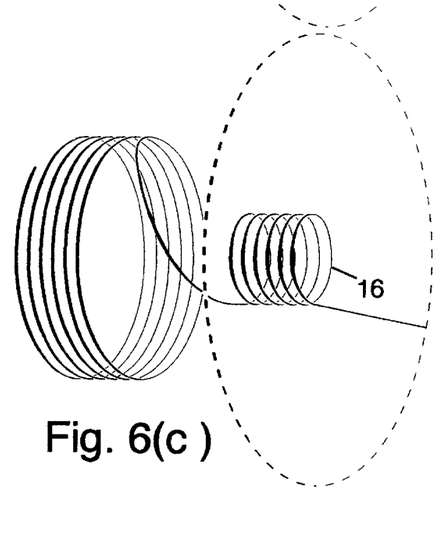
FIG. 6(c) is a schematic diagram illustrating the cutting head operating cycle showing the autocoil at the onset of loading.
Figure 6D:
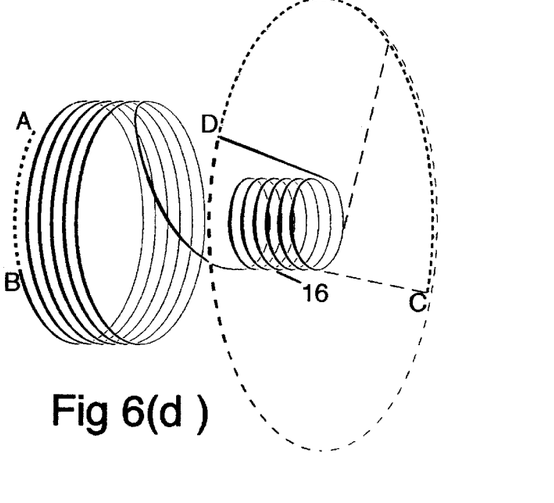
FIG. 6(d) is a schematic diagram illustrating the cutting head operating cycle showing reloading of the autocoil.

The two-part cycle is illustrated in FIGS. 6(a) through 6(d). The device itself has been omitted to better show the cutting line. The first part of the cycle, normal operation, is illustrated in FIGS. 6(a)–6(c). The second part of the cycle, reloading of the autospool, is shown in FIG. 6(d). In FIG. 6(a), the autocoil is full. In FIG. 6(b), some of the autocoil has been consumed. In FIG. 6(c), even more line has been consumed and the coil is on the threshold of loosing its grip. In FIG. 6(d), the autocoil has lost its grip, new line has been extracted from the magazine to restore the autocoil, and normal operation has resumed. Dotted line A-B is the path of the proximal end of the cutting line during reloading. Dashed line C-D is the locus of the equilibrium position of the distal end of the extended cutting line during reloading, showing that a uniform tip circle is maintained even during reloading. The operation of the cutting head is so smooth that the eye of the operator can detect no operating cycle, giving the appearance of wear-proof cutting line.

Many variations of cutting heads are described herein. There are many ways to vary the details of cutting head design to produce devices of different characteristics for different applications, as will become apparent to one skilled in the art upon reference to this specification. A systematic review of variations in cutting head design follows. The implications of these design variations are discussed in more detail later.

Figure 10A:
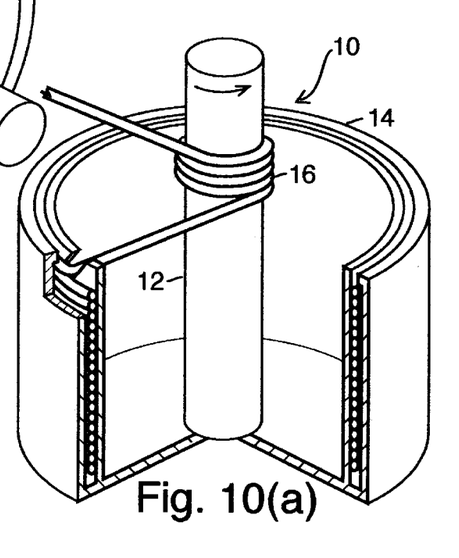
FIG. 10(a) is an isometric view with a cutaway showing a basic cutting head with a single guide at the magazine exit, in accordance with yet another embodiment of the present invention.
Figures 10B, 11, 12A, 12B, 12C, 12D, 12E:
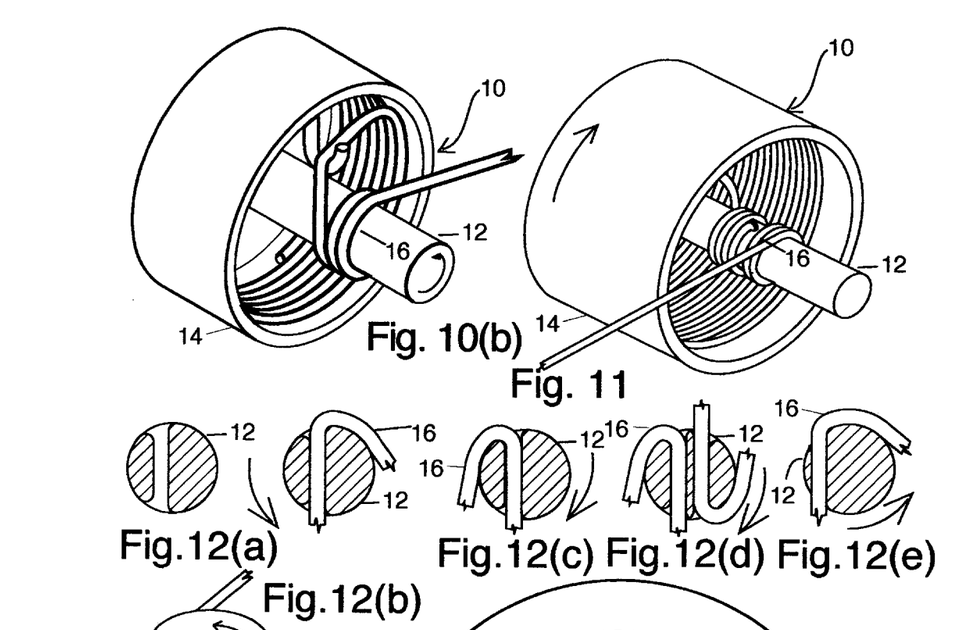
FIG. 10(b) is an isometric view of a basic cutting head with a cylindrical rather than annular magazine, in accordance with still another embodiment of the present invention.
FIG. 11 is an isometric view of a rewind type cutting head equipped with a chord guide through the autospool in accordance with one embodiment of the present invention.
FIG. 12(a) is an axial cross-section of one embodiment of an autospool constructed in accordance with the present invention, showing a chord guide.
FIG. 12(b) is an axial cross-section of a rotating autospool showing cutting line inserted into the chord guide.
FIG. 12(c) is an axial cross-section of an autospool illustrating the effect of reversing the direction of rotation.
FIG. 12(d) is an axial cross-section of an autospool with two chord guides.
FIG. 12(e) is an axial cross-section of an autospool with a chord guide positioned near the edge.

FIGS. 3, 4, 5, and 10(a) are examples of the type of cutting head used in the "basic" embodiment of the present invention. The cutting line slides along a fixed path as it is extracted from the magazine. This design is especially easy to reload and easily accommodates multiple automatic lines. FIG. 10(b) illustrates a basic type cutting head, wherein the magazine is cylindrical rather than annular. In the design shown in FIG. 10(b), the cutting line will not feed correctly if the length of the magazine coil is too long. In the basic type of cutting head, the proximal end of the cutting line is not fixed to the magazine.

Figure 7:
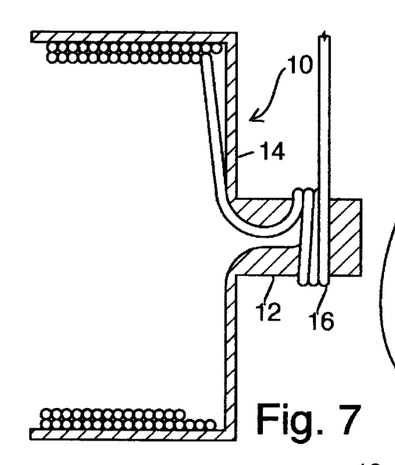
FIG. 7 is a side elevational view showing an axial feed type of cutting head in cross-section, in accordance with one embodiment of the present invention.

FIG. 7 illustrates an "axial feed" type of cutting head. Coiled line is stored inside a cylindrical magazine. Line feeds to the autocoil through a hollow shaft.

Figure 8:
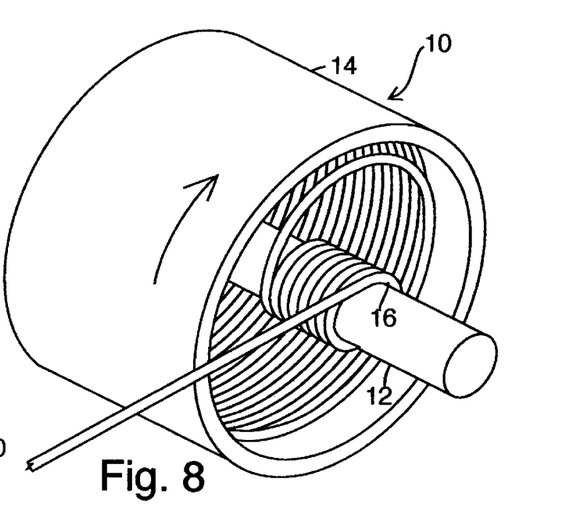
FIG. 8 is an isometric view showing a rewind feed type of cutting head in accordance with another embodiment of the present invention.
Figure 9:
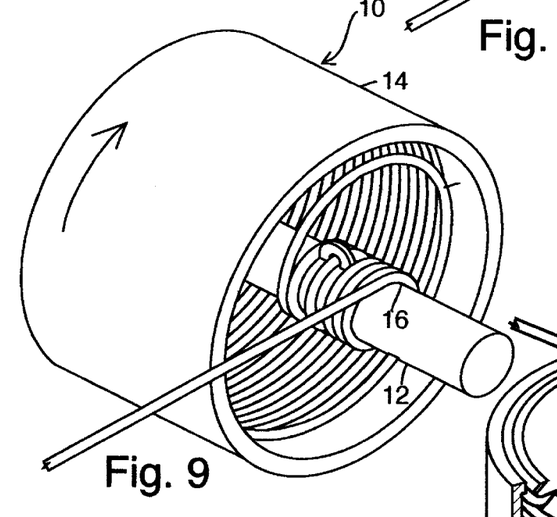
FIG. 9 is an isometric view showing the rewind feed type of cutting head with a single guide in the autocoil.

FIGS. 8, 9, and 11 are examples of a "rewind" type of cutting head, wherein a single-layer coil of cutting line is stored in the cylindrical magazine. As cutting line is extracted, the large diameter magazine coils rewind into small diameter coils on the autospool. As cutting line is used, the autocoil shifts backwards toward the magazine.

The primary advantages in using a conduit or annulus (i.e., the enclosed passageway between the magazine and the autospool), are ease of reloading and high line stability. Simpler designs are also feasible. FIG. 9 shows a single guide on the autocoil, with an eyelet attached to the autospool. FIG. 10(a) shows a single guide at the magazine exit. FIG. 10(b) illustrates the use of a single J-shaped guide. FIG. 11 shows the use of a single "chord" guide. FIG. 4 shows two discrete guides, one at the magazine exit, and another, a chord guide, at the autocoil entrance. The chord guide (see FIG. 12(a)), is so named because it passes through the autospool. FIG. 12(b) shows the chord guide with cutting line. FIG. 12(c) illustrates an important advantage of the chord guide, that the direction of rotation can be reversed. FIG. 12(d) illustrates two chord guides side by side. FIG. 12(e) illustrates an especially low friction chord guide near the edge of the autospool. Of the chord guides illustrated, FIG. 12(e) is the lowest friction, FIG. 12(b) is intermediate friction, and FIG. 12(c) is the highest friction. If the direction of rotation of FIG. 12(e) were reversed, the friction would be very high.

Figures 12F, 13A:
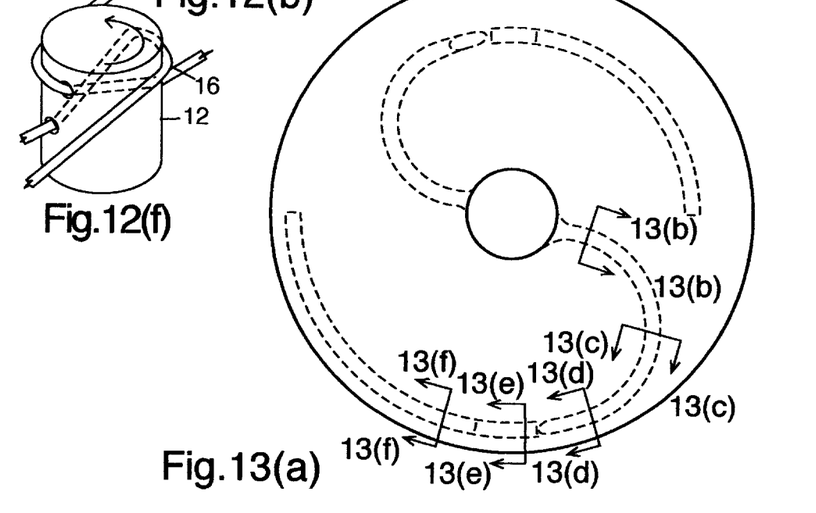
FIG. 12(f) is an isometric view of an autospool and autocoil showing the use of dual-angled chord guides.
FIG. 13(a) is a top plan view of a conduit plate with insertion ramps constructed in accordance with one embodiment of the present invention.
Figure 13B:
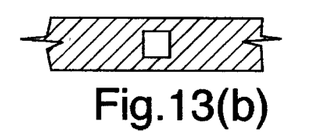
FIG. 13(b) is a sectional view taken along lines 1—1 of FIG. 13(a) showing the conduit.
Figure 13C:
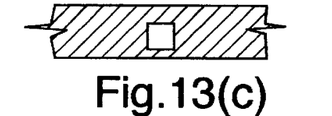
FIG. 13(c) is a sectional view taken along lines 2—2 of FIG. 13(a) showing the conduit.
Figure 13D:
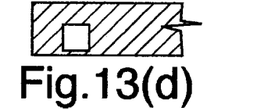
FIG. 13(d) is a sectional view taken along lines 3—3 of FIG. 13(a) showing the conduit.
Figure 13E:
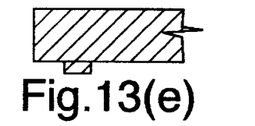
FIG. 13(e) is a sectional view taken along lines 4—4 of FIG. 13(a) showing the insertion ramp.
Figure 13F:
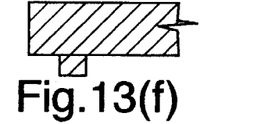
FIG. 13(f) is a sectional view taken along lines 5—5 of FIG. 13(a) showing the insertion ramp.
Figure 14A:
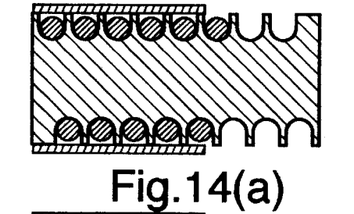
FIG. 14(a) is a longitudinal cross-section of an autospool with a partially enclosed helical passageway showing the autocoil at the onset of loading.
Figure 14B:
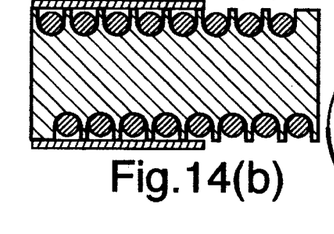
FIG. 14(b) is a longitudinal cross-section of an autospool with a partially enclosed helical passageway showing the autocoil after loading.
Figure 15A:
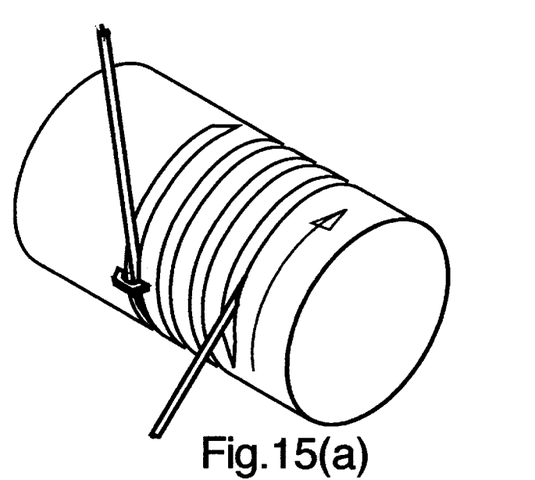
FIG. 15(a) is a perspective view of an autospool constructed in accordance with another embodiment of the invention, with a helical gripping groove to hold the autocoil in place when the trimmer is not spinning, but allow normal winding and unwinding and sliding.
Figure 15B:
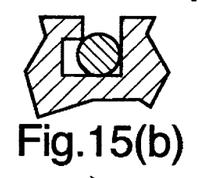
FIG. 15(b) is a sectional view of the helical gripping groove shown in FIG. 15(a)
Figures 16, 17:
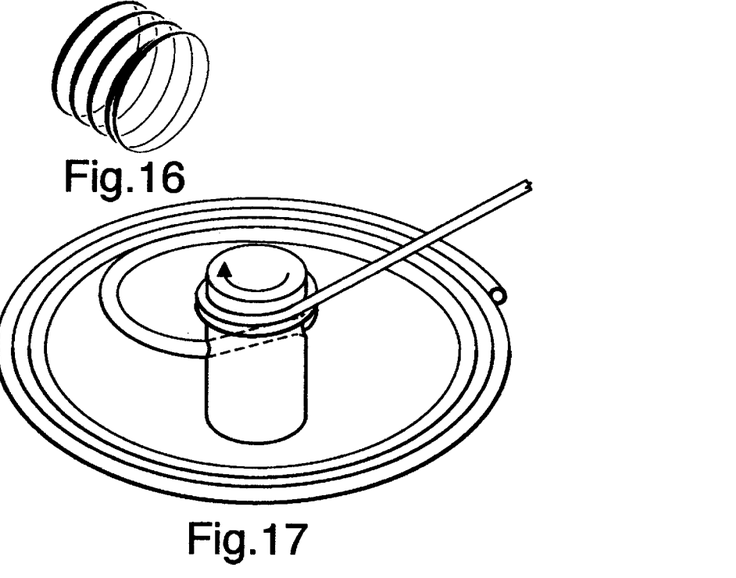
FIG. 16 is a schematic view of an autospool equipped with a helical cutting line gripping groove terminated by a circular groove.
FIG. 17 is an isometric view showing a basic embodiment of a cutting head (push load model) with a spiral tube magazine.

FIG. 12(f) illustrates chord guides which are not perpendicular to the axis of the autospool. FIGS. 13(a) through 13(f) show a conduit plate with internal conduits and insertion ramps. FIGS. 14(a) and 14(b) illustrate an autospool with a partially enclosed helical passageway. FIGS. 15(a) and 15(b) illustrate an autospool with a helical cutting line gripping groove. FIG. 16 illustrates a helical groove terminated by a circular groove.

FIG. 3 illustrates the complete constraint of the magazine line within an enclosed helical passageway, FIG. 17, an enclosed spiral passageway (many other geometries are feasible). FIG. 8 shows the magazine coil supported against a concave cylindrical surface. FIG. 4 shows a magazine with an annular storage chamber.

Figures 18, 19:
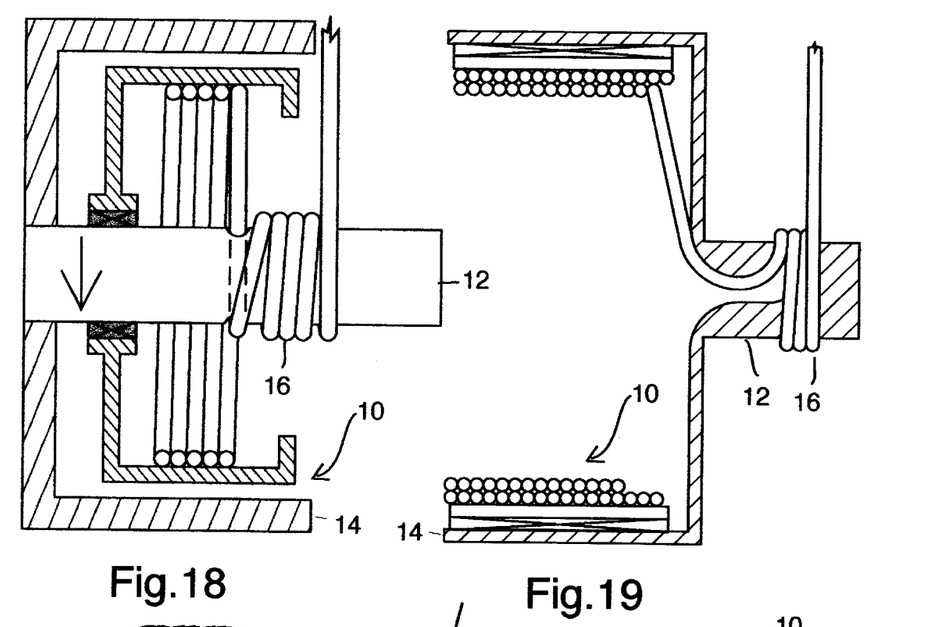
FIG. 18 is a side elevational view showing a basic cutting head in cross-section, equipped with a rotatable reel.
FIG. 19 is a side elevational view showing an axial feed cutting head in cross-section, equipped with a rotatable reel.

FIG. 18 illustrates a basic cutting head equipped with a rotatable reel. FIG. 19 illustrates an axial feed cutting head equipped with a reel, using multiple layers of line. A reel provides increased storage capacity and reduced friction as line is withdrawn; however, each reel can incorporate only one independent automatic cutting line, so for multiple independent lines, multiple independent reels are used.

The rewind type is generally unsuitable for reels. If the rewind cutting head shown in FIG. 8 (no guide on the autospool) were equipped with a reel, it would be unstable, and the autocoil would spontaneously unwind. If the rewind cutting head shown in FIG. 9 (with a guide) were to be equipped with a reel, it would be converted to the basic reel type shown in FIG. 18.

Figures 20, 21A:
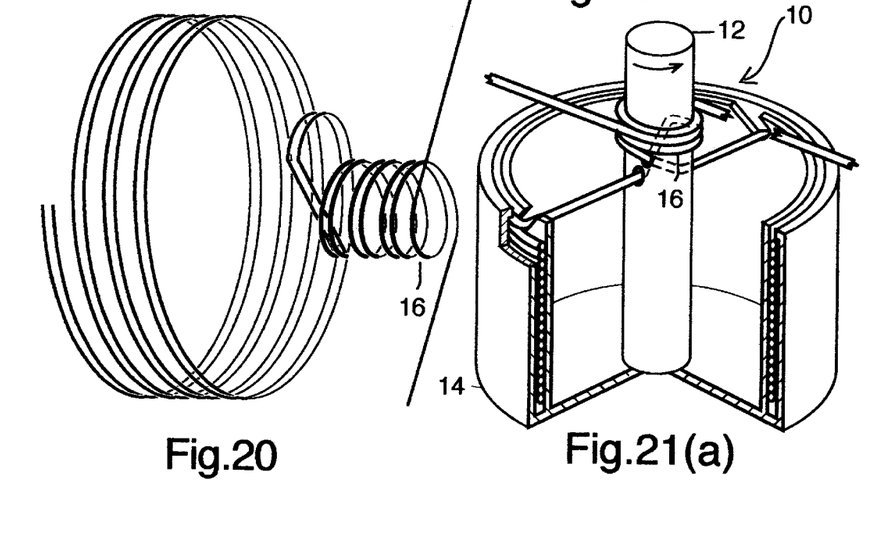
FIG. 20 is an isometric view of multiple lines placed side-by-side in a cutting head in accordance with one embodiment of the present invention.
FIG. 21(a) is an isometric view with a cutaway of a side-load model cutting head with side-by-side placement of two lines in the magazine, but with separate guides for each line.
Figure 22:
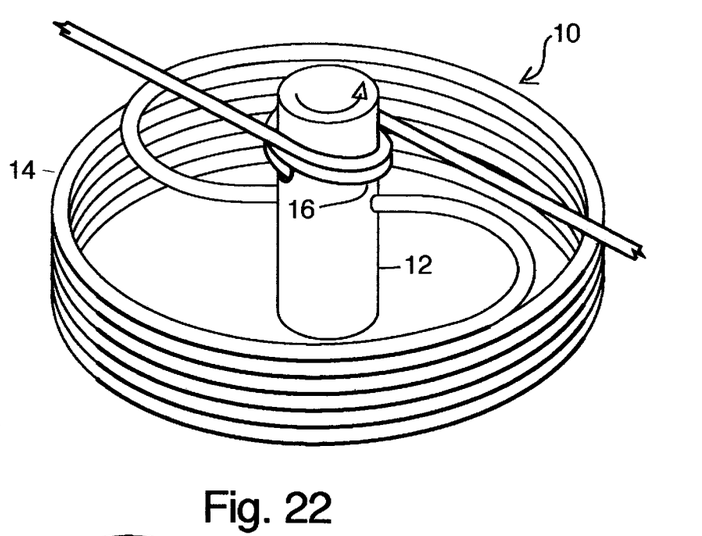
FIG. 22 is an isometric view of a dual-line push-load model cutting head with separate magazines and conduits.
Figure 23A:
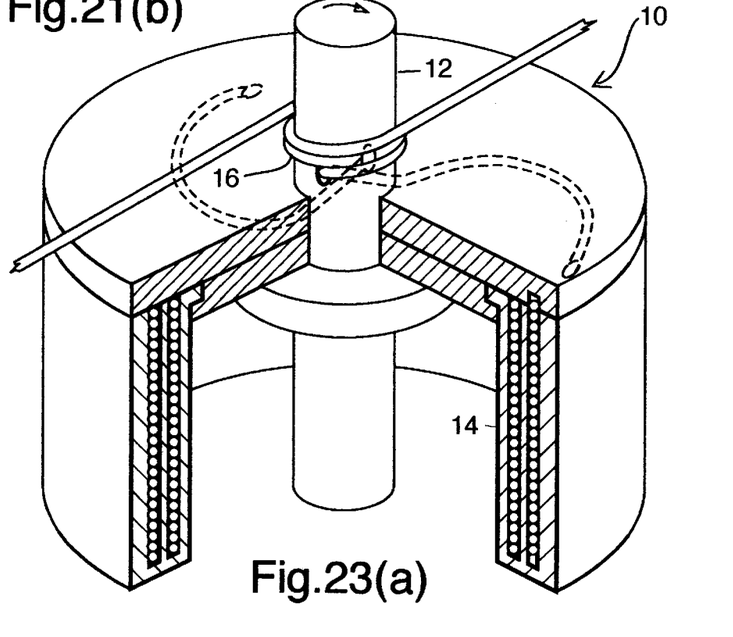
FIG. 23(a) is an isometric view with a cutaway of a dual-line twist-load model cutting head with a separate conduit and annular storage chamber for each line.

A unique and important characteristic of the cutting head constructed in accordance with the present invention is practical multiple automatic independent lines. Multiple lines produce only a trivial increase in the complexity. The simplest way to produce multiple automatic independent lines is to put two lines side by side in the same enclosed passageway. In FIG. 20, the push-load cutting head shown in FIG. 3(a) is loaded with two lines instead of one. The mechanical components are omitted to better show the cutting lines. FIG. 21(a) illustrates separate guides with side-by-side placement in the magazine. FIGS. 22 and 23(a) illustrate separate and independent magazines and conduits.

Figure 24:
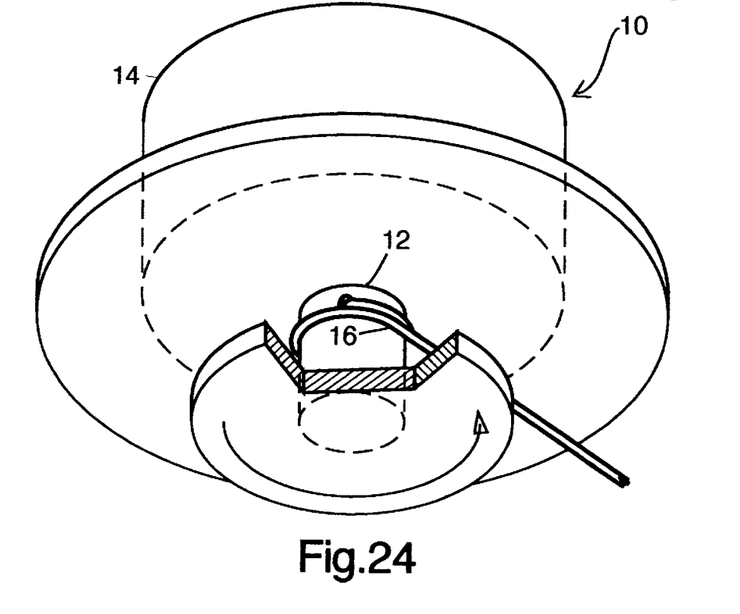
FIG. 24 is an isometric view of an cutting head equipped with a grass rest and a tall grass shield in accordance with one implementation of the present invention.

The grass rest shown in FIG. 24 allows the operator to skim the trimmer back and forth to mow small patches of grass. Without the grass rest, if the operator inadvertently plunged the cutting head vertically downward into the grass while attempting to skim, the grass would interfere with full extension of the cutting line. The tall grass shield shown in FIG. 24 enables the cutting head to operate more conveniently in tall vegetation. Without the shield, tall vegetation may fall down onto the whirling line and interfere with full extension of the cutting line. If it is large enough in diameter, the storage magazine itself may serve as a tall grass shield.

If the whirling line encounters vegetation in the region of the tip circle close to the spool, where velocity is low, the vegetation interferes with proper line extension. If however, the whirling line encounters vegetation in the high-speed region of the tip circle (near the distal end), the line easily cuts or pushes aside the vegetation and no interference with line extension is produced.

Quick and easy reloading is almost as important as automatic, trouble-free operation. Three models with three different loading techniques are described, push load, twist load, and side load. None of the models require tools or disassembly. All can be reloaded with any brand of line. Casual users especially appreciate push load: easy to learn and remember. Heavy duty users appreciate twist load: high storage capacity and fast reloading to get them back on the job with minimum wasted time. The side load model is especially light, simple and inexpensive.

The push-load cutting head, shown in FIGS. 3(a), 17, and 22, is the easiest to load, by inserting one end of a length of line, then feeding it in, leaving about twenty centimeters sticking out. The same procedure is used for each line. Each cutting line is one or two meters long. The capacity cannot be increased by increasing the length of the passageways. After about three coils have been pushed in, no more can be installed because friction gets too high.

The compelling feature of the twist-load model is the ease and speed with which long cutting lines are loaded into the magazine. The capacity of the twist load depends on the dimensions, but a typical storage capacity for a dual line model would be thirty meters, fifteen for each line. To load, about twenty centimeters of line is inserted into each loading hole, as shown in FIG. 5, then the magazine is manually rotated to draw the lines into the housing and wind them into the annular storage spools of the magazine. It is unnecessary to anchor the line to the rotatable magazine. A small amount of friction at the proximal end of the cutting line produces a large increase in total friction because the winding surface is convex. If the convex surface is smooth, two or three coils of line must be inserted into the magazine to assure that the cutting line will engage the magazine when the magazine is manually rotated for loading. Otherwise, the line slips and is not drawn in. Putting a crimp in the line near the proximal end before insertion increases the friction and helps assure that the cutting line will engage the spool and be drawn in.

Figure 23B:
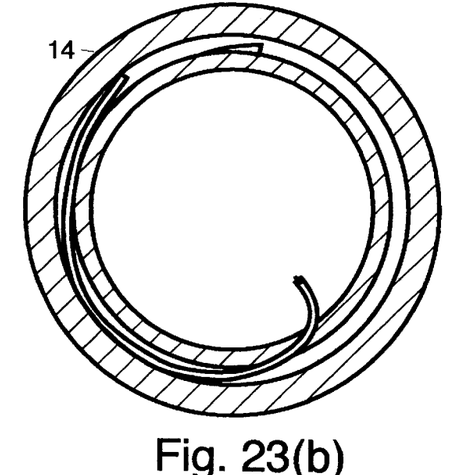
FIG. 23(b) is a sectional view of a manual rotatable magazine usable with the present invention.
Figure 23C:
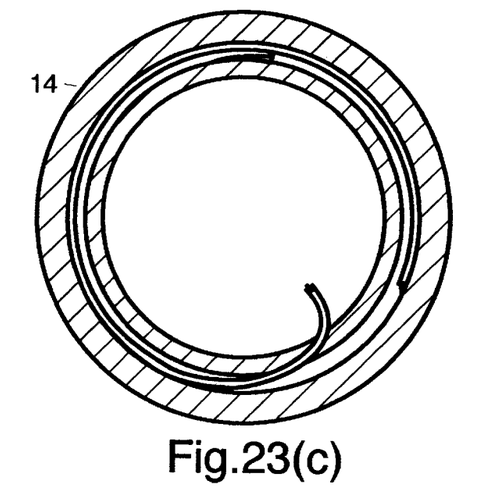
FIG. 23(c) is a sectional view of the manual rotatable magazine with the cutting line abutting the engagement tooth.

It is useful to design the spool so that the friction between the cutting line and the convex surface is high. If the convex surface is equipped with a tooth, as shown in FIG. 23(b), the line engages the spool more positively, reducing the length of the line which must be initially introduced into the spool. With the tooth, it is necessary to insert only about two centimeters of line into the annular storage chamber before manually rotating the magazine. The engagement tooth has no effect on the withdrawal of line from the magazine during operation because centrifugal force rewinds the magazine coil against the concave cylindrical surface as shown in FIG. 23(c).

Figure 21B:
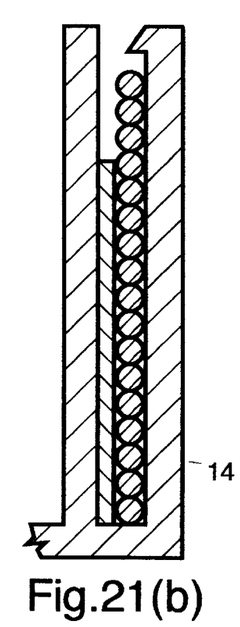
FIG. 21(b) is a sectional view of a side-load annular storage chamber used in one implementation of the present invention, showing the retaining lip and independently rotatable cylindrical sleeve.

In the side load model of FIGS. 4, 10, and 21(a), coils of line are inserted sideways into the annular magazine, one coil at a time. For dual line loading, two lines are placed side-by-side. The retaining lip shown in FIG. 21(b) prevents the coiled filament from slipping sideways out of the annular storage chamber. The independently rotatable cylindrical sleeve shown in FIG. 21(b) allows the operator to extract line from the magazine by pulling on the line, enabling the operator to conveniently make small adjustments in the length of the extended line when the cutting head is not spinning. Without the independently rotatable cylindrical sleeve, line cannot be pulled tangentially from the magazine because of high friction between the coiled line and the convex surface of the annular storage chamber. Without the antifriction sleeve, the length of the line extending from the chamber can be adjusted in one coil increments. If two or more lines are coiled side by side in the annular storage chamber, the anti-friction sleeve allows each line to be manually adjusted independently of the others. Thus, if one of the lines breaks off in operation, the operator can restore the shortened line simply by pulling on it. The anti-friction sleeve has no effect on operation when the cutting head is spinning (as explained in the following paragraph).

Consider the side-load model shown in FIG. 4, a side-load model not equipped with an antifriction sleeve. When the trimmer is turned off, cutting line cannot be extracted from the annular storage chamber by pulling tangentially on the cutting line because of the very high friction between the coiled line and the convex surface of the annular storage chamber. Yet when the trimmer is on, cutting line is easily extracted from the chamber since, when the trimmer is on, centrifugal force coils the cutting line against the concave surface of the annular storage chamber, as shown in FIG. 23(c), and the friction is much reduced. If a coil is supported against a concave cylindrical surface, the effect of tension in the coiled cutting line is to reduce friction. If a coil is supported against a convex surface, the effect of tension is to increase friction.

Basic and rewind type autocoils are not suitable for multilayered magazine coils. Axial, basic reel, and axial reel are well-suited for multilayered magazine coils. Axial, basic reel, and axial reel cutting heads are especially well suited for prefabricated coils of cutting line. The operator still has the option of manual reloading with any brand of cutting line.

Figure 25A:
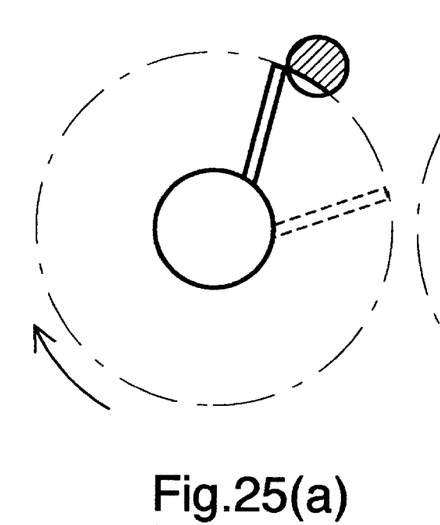
FIG. 25(a) is a schematic illustration of normal cutting showing that only the tip of the cutting line strikes the material.
Figure 25B:
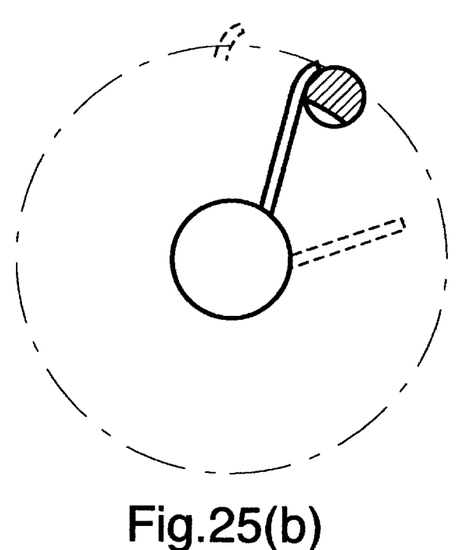
FIG. 25(b) is a schematic illustration of the loss of an entire segment of cutting line from the tip following a sudden jump in the size of the tip circle.

In applications such as trimming vegetation, sawing, and surface grinding, sudden jumps in the diameter of the tip circle can waste line. Ideally, only the distal end of the line strikes the material being cut, so that wear occurs only at the distal end, as illustrated schematically in FIG. 25(a). If the diameter of the tip circle suddenly increases while the line is engaged in cutting, an entire segment of the line, not just the distal end, strikes the material. The entire segment may be sheared off immediately, and all of the new line is wasted, as shown in FIG. 25(b), or the line may be damaged, leading to subsequent premature loss of the tip segment.

The term "precise control" describes the ability of the autospool to feed new line to maintain the tip circle. This does not mean that the size of the tip circle does not change. Because vegetation exerts a drag on the line, the size of the tip circle declines as cutting conditions become more severe. The autospool allows the tip circle to expand and contract in response to changing conditions way while continuing to make appropriate compensations for line wear under all cutting conditions. Thus, when the whirling line engages vegetation, the tip circle declines. The autospool does not attempt to restore the original tip circle, but extends new line to maintain the reduced tip circle.

The behavior of the line when the cutting head is stopped and restarted is an important topic. Inertia may cause the line to shift, so that a small amount of line retracts into or extends from the magazine, but without adverse effect. More importantly, the autocoil must unwind and rewind. Also, if the magazine coils are not well constrained, they may become tangled when the cutting head is at rest or when it restarts.

If the autocoil has only one or two turns, it will rewind neatly without tangling when the cutting head restarts. If the autocoil has only a moderate number of turns, say five, the autocoil will rewind in an irregular manner, but the cutting head will still work properly. If the autocoil has a large number of turns, say ten or more, the line will become tangled when the cutting head starts. With two or three lines, the autocoil will still coil neatly and work properly if the each line forms only one or two coils.

There are several ways to deal with unwinding and rewinding of the autocoil, including constraining the autocoil so it does not unwind, and reducing the number of turns in the autocoil. In FIG. 14(a), the autocoil is held in place within a closed helical passageway. In FIG. 12, the autocoil is held in place by a chord guide at each end. To prevent interference with the automatic reloading of the autospool, the length of the constrained portion of the autocoil does not exceed the length of the autocoil at the onset of the loading cycle. FIG. 14(a) illustrates the onset of the loading cycle, FIG. 14(b), the completion of the loading cycle. FIG. 15 illustrates a helical gripping groove which holds the autocoil in place when the cutting head is not spinning, but allows the line to slide freely for the reloading cycle, and to unwind and rewind to maintain a constant tip circle. The number of turns in the autocoil is determined by the friction required for the autocoil to grip the autospool without slipping. If the friction is supplemented with a high friction guide, as in FIGS. 12(b) and 12(c), the number of coils in the autocoil is reduced.

When the cutting head is at rest, centrifugal force to hold the magazine coils in place is absent. If, as in FIG. 8, the magazine coils are not well constrained, the magazine coils may become tangled when the speed changes, especially when accelerating from rest when centrifugal force to hold the coils in place is absent. Supplemental means to stabilize the magazine coils, such as breakaway adhesive or mechanical clips, may be desirable. If rotation is counterclockwise and the magazine coils are wound clockwise, inertia tends to put the line in tension, a more stable situation. In FIG. 11, a chord guide is used to reverse the direction of winding of the magazine coils to increase stability.

Figure 26:
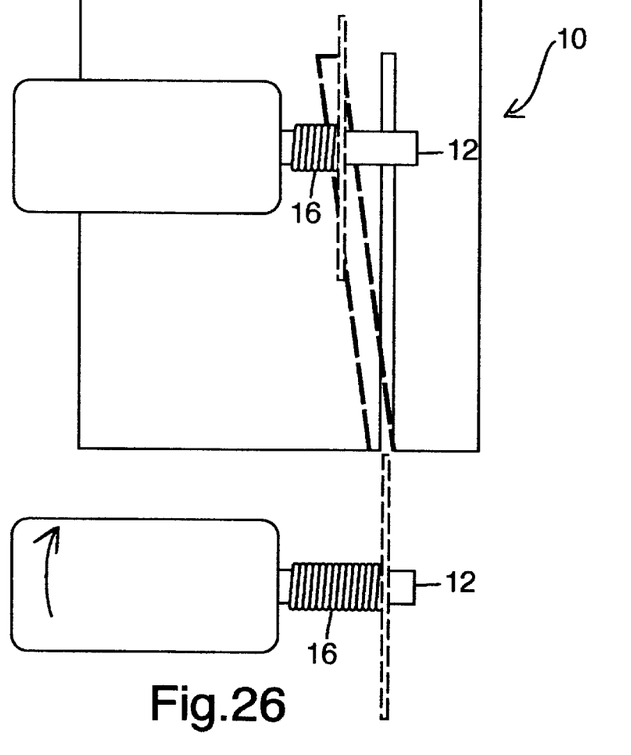
FIG. 26 is an illustration of the tendency of the cutting plane to drift out of the kerf in a sawing operation.

With a simple autospool, the plane of the tip circle migrates up and down the autospool as line is consumed. Migration of the tip circle is very small. The helical groove terminated by a circular groove in FIG. 16 reduces cutting head tip circle migration to the absolute minimum. Sawing is a good example of an application in which axial drift of the tip circle is a problem. FIG. 26 illustrates that as line is consumed, the plane of the tip circle can drift out of line with the intended kerf.

The kinematics of extracting line from the magazine is discussed in detail in the provisional applications cross-referenced above.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the cutting heads described herein have applications beyond trimming lawns, such as machining, fluid mixing, electrical brushes, brakes, debarking, staple fiber production—any device or process requiring a whirling line of precise, predictable length or a whirling line which is consumed. It is therefore contemplated that such modifications can be made without departing from the spirit or scope of the present invention as defined in the appended claims.

What is claimed is:

1. A cutting head for a rotary flail device, the cutting head comprising:

means for retaining a coil portion of a cutting line, the cutting line having a distal portion attached to the coil portion, and an end at the distal portion which traces a tip circle when the distal portion extends tangentially from said retaining means and is rotated;

means for feeding a portion of an excess of the cutting line to said retaining means to adjust the coil portion of the cutting line, said feeding means restoring a length of the distal portion of the cutting line to maintain the tip circle with a desired size; and means for storing the excess of the cutting line, wherein said storing means includes a magazine for receiving the excess of the cutting line disposed in a helical path, and said magazine further includes a helically wound conduit.

2. The cutting head of claim 1 wherein said retaining means includes a spool having an outer cylindrical surface upon which is wound the coil portion of the cutting line, said spool being rotatable about an axis.

3. The cutting head of claim 1 wherein said feeding means extends the distal portion of the cutting line by locating the coil portion and the excess of the cutting line such that a centrifugal force arising from rotation of the distal portion overcomes a drag force on the distal portion to unwind a precise amount of the coil portion from said retaining means.

4. A rotary flail comprising:

a cutting line;

a rotary motor;

a spool member mounted to said rotary motor with an axis of rotation, said spool member receiving a coil portion of said cutting line, said cutting line further having a distal portion attached to the coil portion, and an end at the distal portion which traces a tip circle when the distal portion extends tangentially from said spool member and said rotary motor rotates said spool member at a high speed; and means for extending the distal portion of said cutting line by locating the coil portion and an excess of said cutting line such that a centrifugal force arising from rotation of the distal portion overcomes a drag force on the distal portion to unwind a precise amount of the coil portion from said spool member, and thereby restore a length of the distal portion of said cutting line and maintain the tip circle with a desired size, said extending means feeding the coil portion of said cutting line through a longitudinal hole in said spool member.

5. The rotary flail of claim 4 further comprising magazine means for receiving the excess of said cutting line disposed in a helical path, wherein the helical path defines a helix having an axis which generally coincides with the axis of said spool member.

6. The rotary flail of claim 4 wherein the coil portion of said cutting line slides along a fixed path of extraction from said extending means.

7. The rotary flail of claim 4 wherein said extending means rewinds said cutting line from a magazine coil into the coil portion of said cutting line, the magazine coil having a diameter which is larger than a diameter of the coil portion.

8. The rotary flail of claim 4 wherein said cutting line is a first cutting line, and further comprising a second cutting line, said spool member receiving a coil portion of said second cutting line, and said extending means further extending a distal portion of said second cutting line to maintain a second tip circle with a desired size.

9. The rotary flail of claim 4 further comprising guide means for locating the coil portion of said cutting line about said spool member.

* * * * *